United States Patent Office 3,019,204
Patented Jan. 30, 1962

3,019,204
HARDENABLE POLYSILOXANE COMPOSITIONS AND CURING CATALYSTS THEREFOR
Jerome A. Preston, Toledo, Ohio, assignor to The Ranson & Randolph Company, Toledo, Ohio, a corporation of Ohio
No Drawing. Filed Oct. 24, 1957, Ser. No. 692,026
13 Claims. (Cl. 260—18)

This invention relates to hardenable compositions and to curing catalysts, and, more particularly, to hardenable silicone resins and to curing catalyst compositions for use therewith.

The use of various metal salts of organic acids for accelerating the cure of polysiloxane resins has been suggested (see U.S. Patent 2,449,572). Such metal salts are effective for this purpose, and are satisfactory in many operations. In other instances, however, the cure achieved with a metal salt of an organic acid is unsatisfactory for one reason or another. As a specific instance, tin octoate can be used to activate the cure of methyl silicones, and, when used in combination with an addition agent, for example, an alkyl silicate, may even effect cure at room temperature. When the methyl silicone which is cured is blended with an appropriate filler, and is of a suitable structure, the cured product is a silicone rubber. A silicone rubber which is cured at room temperature, provided that it has the requisite dimensional stability in the cured condition, constitutes an excellent impression material, and can be used in dental work. Suitable silicone rubbers, however, when catalyzed with tin octoate, for example, cure very rapidly to a gelled condition in which they cannot be worked. In most instances, the working time, or the time between initial mixing of the tin octoate with the silicone rubber to gel formation, is too short for the carrying out of the various manipulations necessary to produce a satisfactory impression. The use of a catalyst composition comprising a metal organic compound and a polymerization retarder to increase the working life of room temperature curing silicone rubbers is disclosed and claimed in a copending application Serial No. 646,570, now abandoned. When tin octoate, for example, and a polymerization retarder of the type disclosed in the said copending application are mixed with a room temperature curable silicone rubber, the working life of the silicone rubber is increased to an extent which depends upon the proportion of the retarder employed, so that any required working time can be provided. Varying the amount of tin octoate or of most other metal organic compounds does not appreciably increase the available working time, so long as a sufficient amount of the compound is employed to achieve a satisfactory cure. In the specific case where tin octoate is employed to catalyze the cure of a particular silicone material which is commercially available under the trade designation "GE Dental Impression Material,"[1] the working life, after addition of the compound,

[1] "G.E. Dental Impression Material" identifies a material produced substantially in accordance with Example 1 of U.S. Patent 2,843,555 issued to Berridge on July 15, 1958. Such material is produced in the following manner:
100 parts of octamethylcyclotetrasiloxane is heated for about 2 to 4 hours at a temperature of about 140° C. with about 0.01%, by weight, of potassium hydroxide until a highly viscous mass bordering on a gummy solid is obtained. This linear, long-chain methypolysiloxane has a viscosity of about 2,000,000 centipoises and has a ratio of approximately two methyl groups per silicon atom. This high molecular weight methylpolyxiloxane is mixed with 0.5% by weight, thereof water, and the mixture of ingredients heated with stirring for about two hours at 150° to 175° C. until a product having a viscosity of about 2,000 centipoises (at about 30° C.) is obtained. This material is a linear, fluid methylpolyxiloxane having terminal silicon-bonded hydroxyl groups. To 100 parts of this low molecular weight polymer are added 20 parts of diatomaceous earth, 20 parts zinc oxide, and 30 parts calcined clay. The above mixture is then blended with 2 parts of a liquid, water-insoluble hydrolysis product of partial tetra-ethyl silicate to complete the formulation of the curable material.

may vary from about 2¼ minutes to about 2 minutes when the amount of tin octoate is varied from the minimum to the maximum amount thereof which gives a satisfactory cure.

It has been found that lithium organic compounds have a property which is unique, so far as is known. This unique property involves an ability to cure silicone materials to a given extent, insofar as can be judged from physical properties, regardless of the amount of the lithium compound used, within substantial limits. The time required for the lithium organic compound to effect such degree of cure, however, varies as an inverse function of the proportion thereof used. Silicone rubbers cured with an organic lithium compound, however, do not accurately reproduce cavities in which the cure occurs. The use of lithium metal compounds, therefore, to facilitate the cure of silicone rubbers for impression work is not feasible.

The present invention is based upon the discovery that a combination, in certain proportions, of a tin organic compound and a lithium organic compound can be used as a polymerization catalyst for various silicone materials, that silicones cured therewith accurately reproduce cavities in which cure occurs, and that the working time after the catalyst composition is mixed with the silicone is an inverse function of the proportion of the catalyst composition employed. As a consequence, such compositions can be used satisfactorily to catalyze the cure of silicones for impression work, and the available working time can be varied within substantial limits to suit the needs of a particular situation.

It is, therefore, an object of the invention to provide an improved composition comprising a curable silicone and a catalyst composition which is a solution comprising tin and lithium present in the solution as part of an organic compound.

It is a further object of the invention to provide a catalyst composition which is a solution comprising tin and lithium present in the solution as a part of an organic compound.

It is still another object of the invention to provide a stabilized catalyst composition which is a solution comprising tin and lithium present in the solution as a part of an organic compound.

Other objects and advantages will be apparent from the description which follows, which is intended only to illustrate and disclose, and in no way to limit, the invention.

According to the invention a new composition of matter is provided. Such composition comprises a hardenable hydrocarbon polysiloxane resin containing an average of more than one and less than two hydrocarbon groups per silicon atom, and a curing catalyst in an amount sufficient to convert the said resin to a hardened, tack-free state. The curing catalyst is a solution comprising tin and lithium present as part of an organic compound which is soluble in the resin.

In another aspect, the invention provides the catalyst composition which is defined in the preceding paragraph.

Examples of various lithium organic compounds which can be used in accordance with the invention as part of a catalyst composition include diphenyl lithium, phenyl lithium, lithium octoate, lithium 2-ethyl hexoate, octyl-lithium, and n-butyl lithium. Examples of tin organic compounds which can be used as a part of a catalyst composition in accordance with the invention include diphenyl tin, tin 2-ethyl hexoate, tin octoate, and dibutyl tin dilaurate. In addition to the above-named tin organic compounds and lithium organic compounds, other such compounds can also be employed, as can organic compounds of both lithium and tin. Examples of suitable organic compounds of both lithium and tin for use as catalysts in accordance with the invention include tri-ethyl tin lithium and tri-phenyl tin lithium.

It has been found that, in order to achieve both a satisfactory cure of a silicone material with a catalyst composition in accordance with the invention and a working time which varies as an inverse function of proportion of catalyst composition employed, the weight ratio of lithium to tin should be at least 1:3, but not greater than 6:1. Preferred results have been achieved when the weight ratio of lithium to tin in the catalyst composition has been from 1:1 to 4:1, and optimum results have been achieved when this ratio has been from 2:1 to 3:1.

It has been found that the amount of a catalyst composition comprising a lithium organic compound and a tin organic compound used to cure a silicone should be such that the composition which is produced, comprising the silicone and the catalyst composition, contains from about 0.001 percent to about 1.0 percent of lithium and tin, calculated as metals, and based upon the weight of the silicone resin. When the catalyst composition is used in such proportions, curing times within the required range are achieved in most instances. For example, working life of a silicone impression material can be varied from the minimum that is desired under any circumstances to the maximum that is required under other circumstances.

The terms "percent" and "parts" are used herein, and in the appended claims, to refer to percent and parts by weight, unless otherwise indicated.

As has been indicated above, hardenable hydrocarbon-polysiloxane resins containing an average of more than 1 and less than 2 hydrocarbon groups per silicon atom are catalyzed by admixture with the indicated catalyst compositions. Such resins can be produced, for example, as described in U.S. Patents 2,258,218 through 2,258,222. Such resins are well known, and need not be described in detail. The resins can be cured either alone, or in admixture with various fillers to impart particular properties to the cured materials. For example, as is disclosed in Silicones and Their Use, MacGregor, McGraw Hill Company, Inc., New York, 1954, pages 164 and following, silicone rubbers can be produced from such resins. The silicone rubbers have been found to be particularly advantageous for use as dental impression materials when catalyzed in accordance with the present invention so that either a relatively short or a somewhat extended working life is imparted thereto.

The following example is presented solely for the purpose of further illustrating and disclosing the invention, and is in no way to be construed as a limitation thereon.

*Example*

A durable silicone material, which is commercially available under the trade designation "G.E. Dental Impression Material" and, specifically identifies the material produced by practicing the method previously set forth in the footnote on page 3 herein, was cured at room temperature with a catalyst composition according to the invention. A gram portion of the above silicone material was mixed with a 0.2 gram portion of a catalyst composed of 0.1 gram of lithium octoate and 0.1 gram tin octoate, and the resulting admixture was allowed to stand at room temperature. At the end of a few minutes, the resulting composition had cured to a gelled condition and, at the end of a few more minutes had cured to a hard condition. By varying the proportion of this silicone material to catalyst composition working times ranging from about 2 minutes to about 6 minutes can be provided.

It has also been found that a solution of tin octoate in 2-ethyl hexanoic acid deteriorates after standing for only a relatively short period of time. As deterioration proceeds, the tin octoate becomes progressively less effective as an activator until such a solution, after having aged for about three months, is completely unsuited for activating, in the proportions in which a fresh solution is used, the room temperature cure of a silicone rubber. It has been found that 4-dimethylamino azobenzene

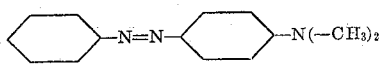

substantially retards such deterioration. A solution of tin octoate in 2-ethyl hexanoic acid which contains from about 0.02 percent to about 0.5 percent thereof is effective as an activator, in the same proportions as when fresh, after having stood for at least four months.

It will be apparent that various changes and modifications can be made from the specific details disclosed herein and shown in the examples without departing from the spirit and scope of the attached claims.

What I claim is:

1. A curing catalyst which is a solution comprising tin and lithium, each of which is present in the solution as a part of an organic compound, said lithium calculated as the metal, constituting at least 1 percent by weight of the catalyst with the weight ratio of lithium to tin being at least 1:3 but not greater than 6:1, and in which the solution includes from 0.02 percent to 0.5 percent of 4-dimethylamino azobenzene.

2. A curing catalyst as claimed in claim 1 wherein the organic portion of the lithium compound is a hydrocarbon.

3. A curing catalyst as claimed in claim 1 wherein the organic portions of the lithium and tin compounds are hydrocarbons.

4. A curing catalyst as claimed in claim 1 wherein the compound is a combined lithium and tin compound of a hydrocarbon.

5. A curing catalyst as claimed in claim 1 wherein the lithium compound is phenyl lithium and the tin compound is tin 2-ethyl hexoate.

6. A curing catalyst as claimed in claim 1 wherein the lithium compound is lithium 2-ethyl hexoate and the tin compound is dibutyl tin dilaurate.

7. A method for producing a cured silicone material which comprises establishing a body of a hardenable polydimethylsiloxane, mixing with the polydimethylsiloxane a curing catalyst which is a solution comprising tin and lithium, said tin and lithium each being present as part of an organic compound which is soluble in the polydimethylsiloxane, and being added to the extent of from about 0.0001 percent to about 1 percent, based upon the weight of the polydimethylsiloxane, and in an amount sufficient to convert the said resin to a hardened, tack-free state, the weight ratio of lithium to tin being at least 1:3, but not greater than 6:1, shaping the resulting mixture into a desired configuration, and maintaining the mixture in such configuration until cure of the polydimethylsiloxane has proceeded to a required extent.

8. A method as claimed in claim 7 wherein the organic portion of the lithium compound is a hydrocarbon.

9. A method as claimed in claim 7 wherein the organic portion of the lithium and tin compounds are hydrocarbons.

10. A method as claimed in claim 7 wherein the curing catalyst is a compound which is a combined lithium and tin compound of a hydrocarbon.

11. A method as claimed in claim 7 wherein the lithium compound is phenyl lithium and the tin compound is tin 2-ethyl hexoate.

12. A method as claimed in claim 7 wherein the lithium compound is lithium octoate and the tin compound is tin octoate.

13. A method as claimed in claim 7 wherein the lithium compound is lithium 2-ethyl hexoate and the tin compound is dibutyl tin dilaurate.

(References on following page)

References Cited in the file of this patent

UNITED STATES PATENTS

| | | |
|---|---|---|
| 2,448,556 | Sprung et al. | Sept. 7, 1948 |
| 2,449,572 | Welsh | Sept. 21, 1948 |
| 2,814,601 | Currie et al. | Nov. 26, 1957 |
| 2,818,906 | Braley | Jan. 7, 1958 |
| 2,833,742 | Koch | May 6, 1958 |
| 2,843,555 | Berridge | July 15, 1958 |

OTHER REFERENCES

Rochow: Chemistry of Silicones, 2nd ed., 1951, pub. by John Wiley & Sons, Inc., New York, pgs. 80–97.